US012664605B2

(12) United States Patent      (10) Patent No.:    US 12,664,605 B2

Nahval et al.             (45) Date of Patent:      Jun. 23, 2026

(54) MULTI-CONTEXT DYNAMIC LINE BUFFER MANAGEMENT FOR IMAGE PROCESSING

(71) Applicant: QUALCOMM Incorporated, San Diego, CA (US)

(72) Inventors: Vinod Kumar Nahval, Mountain House, CA (US); Mei Yang, San Diego, CA (US); Srivaishnavi Sree Krishnan, Sunnyvale, CA (US); Rohan Desai, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 329 days.

(21) Appl. No.: 18/448,440

(22) Filed: Aug. 11, 2023

(65) Prior Publication Data

US 2025/0056137 A1     Feb. 13, 2025

(51) Int. Cl.
| | |
|---|---|
| *G06T 1/60* | (2006.01) |
| *G06T 1/20* | (2006.01) |
| *H04N 25/42* | (2023.01) |
| *H04N 25/75* | (2023.01) |
| *H04N 25/77* | (2023.01) |

(52) U.S. Cl.
CPC .................. *G06T 1/60* (2013.01); *G06T 1/20* (2013.01); *H04N 25/42* (2023.01); *H04N 25/75* (2023.01); *H04N 25/77* (2023.01)

(58) Field of Classification Search
CPC . G01T 1/60; G01T 1/20; H04N 25/75; H04N 25/77; H04N 25/42
See application file for complete search history.

(56) References Cited

U.S. PATENT DOCUMENTS

| | | | |
|---|---|---|---|
| 8,667,190 B2 * | 3/2014 | Robertson | G06F 12/127 |
| | | | 710/56 |
| 10,362,267 B2 * | 7/2019 | Cha | H04N 23/45 |
| 2018/0227541 A1 * | 8/2018 | Cha | H04N 23/42 |
| 2019/0313026 A1 | 10/2019 | Cheng et al. | |

OTHER PUBLICATIONS

International Search Report and Written Opinion—PCT/US2024/038988—ISA/EPO—Oct. 16, 2024.

* cited by examiner

*Primary Examiner* — Marly S Camargo

(74) *Attorney, Agent, or Firm* — Shumaker & Sieffert, P.A.

(57) ABSTRACT

A system comprises an image signal processor (ISP). The ISP is a discrete hardware unit and includes a line buffer, a memory controller, and one or more image processors. The memory controller is configured to allocate blocks within the line buffer to a plurality of contexts, and for each of the contexts: receive one or more lines of image data associated with a respective context and store the one or more lines of the image data associated with the context in a respective block allocated to the respective context. The one or more image processors of the ISP are configured to, for each respective context of the plurality of contexts, process the one or more lines of the image data associated with the respective context that are stored in the line buffer.

19 Claims, 5 Drawing Sheets

MULTI-CONTEXT DYNAMIC LINE BUFFER MANAGEMENT FOR IMAGE PROCESSING

TECHNICAL FIELD

This disclosure relates to systems for image processing.

BACKGROUND

There are an increasing number of devices that include multiple image sensors. For example, modern vehicles may include image sensors that capture image data from multiple directions. In this example, the image data captured from such image sensors may be used for a variety of purposes, such as for autonomous driving. In another example, a smartphone may include multiple image sensors. In this example, the smartphone may use image data from the multiple image sensors to allow a user to select which of the image sensors produced an image that a user prefers.

SUMMARY

In general, this disclosure describes techniques for processing image data. Conventionally, each image sensor is associated with its own respective memory unit that includes a line buffer that stores image data obtained from the associated image sensor. Image data in the line buffer may be processed for use in one or more applications. The use of separate memory units for different image sensors may allow image sensors to added on a modular basis. However, the inclusion of separate memory units for different image sensors is associated with increased cost and complexity. Moreover, integrating image data from these image sensors may be difficult.

The techniques of this disclosure may address these problems. For example, an image signal processor (ISP) may allocate blocks within a single line buffer to respective "contexts" in a plurality of contexts. Each of the contexts may be a stream of image data. For instance, a context may include image data generated by an image sensor. In another example, a context may be a region of interest within the image data generated by an image sensor. The ISP may be a discrete hardware unit within a device. The ISP includes one or more image processors and a memory that includes the line buffer. The ISP receives streams of image data associated with the contexts. For each of the streams of image data, the ISP may store the stream of image data in a block allocated to the context with which the stream of image data is associated. One or more image processors of the ISP may process the streams of image data stored in the line buffer in the block allocated to the context. By using a single line buffer, the need for separate memory units with separate line buffers for different image sensors may be avoided. Furthermore, because the ISP allocates blocks within the single line buffer, the same memory unit and ISP hardware can be used for different numbers of contexts. Moreover, blocks of different sizes can be allocated to different contexts, e.g., based on the sizes and/or bit depths of image data in the contexts. The flexibility to allocate blocks of different sizes may enable the hardware of the ISP to be used in a wider variety of devices and scenarios. Additionally, because the ISP may allocate blocks of different sizes for different contexts, the ISP may be able to utilize the memory unit more efficiently, freeing up space for other purposes.

In one example, this disclosure describes a method of processing image data includes a system comprising: an image signal processor (ISP), wherein the ISP is a discrete hardware unit and includes a line buffer, a memory controller, and one or more image processors, wherein the memory controller is configured to: allocate blocks within the line buffer to a plurality of contexts; and for each of the contexts: receive one or more lines of image data associated with a respective context; and store the one or more lines of the image data associated with the context in a respective block allocated to the respective context, and wherein the one or more image processors of the ISP are configured to, for each respective context of the plurality of contexts, process the one or more lines of the image data associated with the respective context that are stored in the line buffer.

In another example, this disclosure describes a method of processing image data, the method comprising: allocating, by a memory controller of an image signal processor (ISP), blocks within a line buffer to a plurality of contexts, wherein the ISP is a discrete hardware unit, the ISP includes one or more image processors and the line buffer; and for each of the contexts: receiving, by the memory controller, one or more lines of image data associated with a respective context; storing, by the memory controller, the one or more lines of the image data associated with the context in a respective block allocated to the respective context; and processing, by one or more of the image processors, the one or more lines of the image data associated with the respective context that are stored in the line buffer.

The details of one or more examples are set forth in the accompanying drawings and the description below. Other features, objects, and advantages will be apparent from the description, drawings, and claims.

DETAILED DESCRIPTION

A system may obtain streams of image data associated with multiple contexts, such as image sensors or regions of interest. The system may process the image data for various purposes, such as to prepare the image data for use in autonomous navigation or encoding. Conventionally, there is an ISP associated with each of the contexts. An ISP associated with a context includes a line buffer that store one or more lines of the image data. A line of image data may include data associated with a row of pixels of an image, a row of blocks (e.g., macroblocks, largest coding units, etc.) of an image, and so on. The ISP also includes processing circuitry that read lines of image data into the line buffer, process image data in the line buffer, and transfer out processed image data from the line buffer. For example, the processing circuitry included in the ISP may apply one or more filters to lines on the line buffer. A line buffer may differ from ordinary memory in that the line buffer may be closer to the processing circuitry and therefore retrieval of image data from the line buffer during processing may be much faster than reading the image data from a more remote memory unit. Because a line buffer is closer to the processing circuitry of the ISP, the size of the line buffer may be more limited. Including a separate ISP for each context may lead to increased costs and complexity because the processing circuitry may need to be replicated multiple times, power supply systems may be complicated, and for other reasons.

The techniques of this disclosure may address these problems. As described herein, an ISP may allocate blocks within a line buffer to a plurality of contexts. The ISP is a discrete hardware unit. The ISP includes one or more image processors and a memory that includes the line buffer. For each of the contexts, the ISP may receive one or more lines of image data associated with the context. The ISP may store the lines of stream of image data associated with the context in the block allocated to the context. One or more of the image processors of the ISP may process the one or more lines of image data associated with the context that are stored in the line buffer. Because a single ISP and line buffer may be used for multiple contexts, the complexity associated with multiple ISPs and line buffers may be reduced. This may be helpful when developing a system for processing image data associated with a flexible number of contexts.

Figure 1:
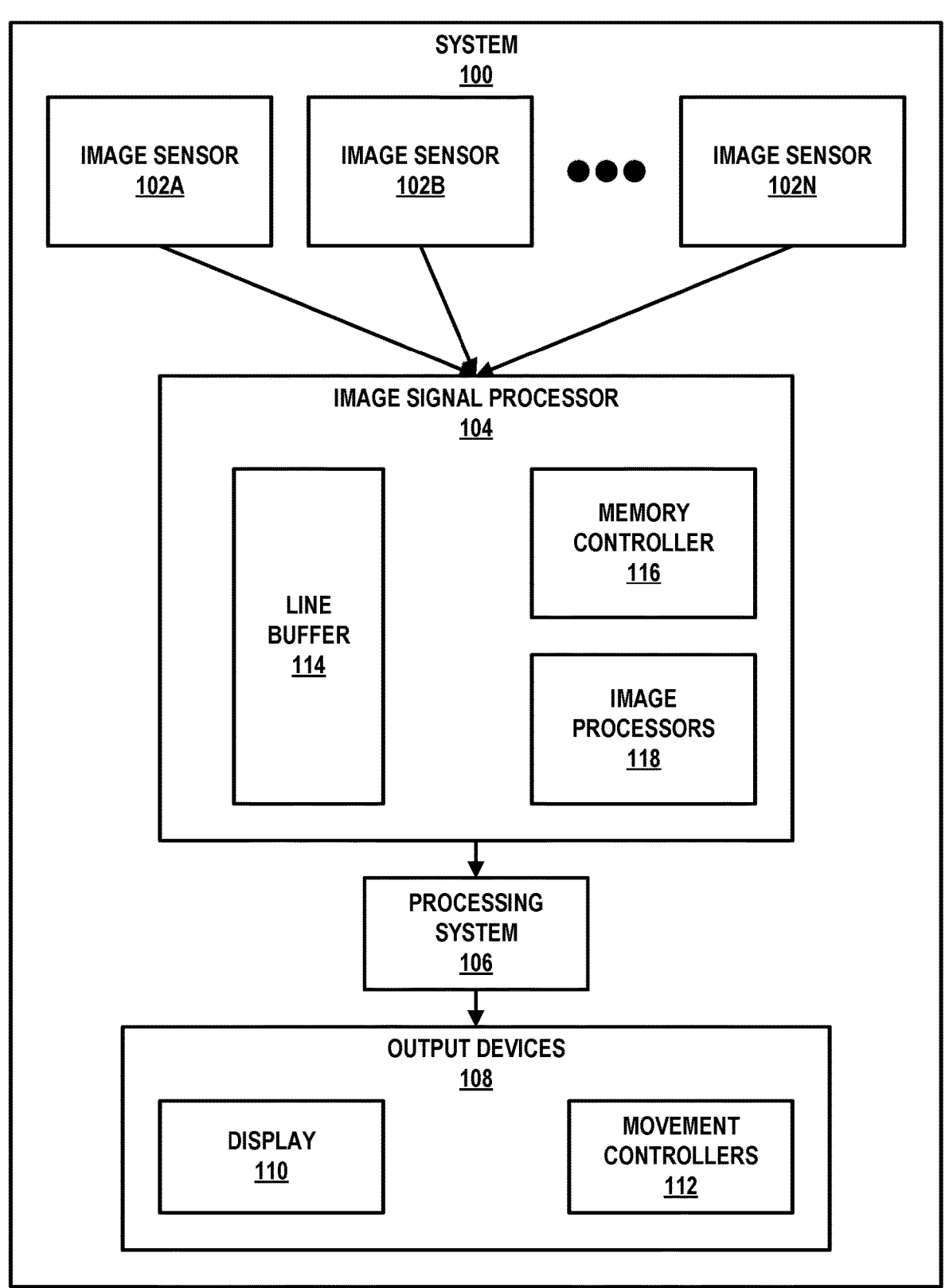
FIG. 1 is a block diagram illustrating an example device including a plurality of image sensors and an image signal processor according to techniques of this disclosure.

FIG. 1 is a block diagram illustrating an example system 100 that includes a plurality of image sensors 102A-102N (collectively, "image sensors 102"), an image signal processor (ISP) 104, a processing system 106, and one or more output devices 108. In various examples, system 100 may be part of a vehicle, smartphone, mobile device, computing device, robot, or other type of device.

Image sensors 102 are configured to generate image data, such as optical video data, depth image data, night-vision image data, and so on. Image sensors 102 may include cameras or other types of sensors that generate image data. Image sensors 102 may be positioned at various locations around system 100. For instance, in an example where system 100 is a vehicle, image sensors 102 may include one or more forward-facing image sensors, one or more rear-facing image sensors, one or more left-side image sensors, one or more right-side image sensors, trailer image sensors, underbody image sensors, cargo bed image sensors, and so on. In some examples where system 100 is a vehicle, image sensors 102 may include one or more in-cabin image sensors. For instance, image sensors 102 may include one or more image sensors directed to the driver, one or more image sensors directed to a front-seat passenger, one or more image sensors directed to the rear seat, and so on. In-cabin image sensors may be used to determine whether the driver is distracted, e.g., in scenarios where the vehicle is semi-autonomous. In an example where system 100 is a smart-phone, image sensors 102 may include one or more rear-facing image sensors and one or more user-facing image sensors.

The image data generated by image sensors 102 may have different characteristics. For example, individual image sensors 102 may generate image data having different height and width sizes, different color bit depths, different pixel sizes, different color-coding schemes (e.g., Red-Green-Blue, YCbCr, etc.), and so on. There may be different numbers of image sensors 102 in different systems and the image data generated by image sensors 102 within those systems may have different characteristics.

ISP 104 comprises a discrete hardware unit within system 100. For example, ISP 104 may be a modular, self-contained unit of hardware within system 100. In different examples, ISP 104 may or may not be connected to a motherboard shared with processing system 106. In some instances, this disclosure may refer to ISP 104 as a "core." A role of ISP 104 is to preprocess image data generated by image sensors 102 prior to use of the image data by processing system 106. Examples of preprocessing the image data may include harmonizing characteristics of image data across image sensors 102, synchronizing image data, regularizing illumination levels across image sensors 102, correcting for lens distortion, increase gain at corners of images, and other tasks that ready the image data for use by processing system 106. ISP 104 may be part of a larger pipeline for processing image data.

Processing system 106 may include one or more processing units (i.e., processors). In some examples, processing system 106 may include a pipeline of processors. Processing system 106 may obtain image data that has been preprocessed by ISP 104. Processing system 106 may use the image data for one or more purposes. In some examples, processing system 106 may apply one or more filters to the image data. In an example where system 100 is a vehicle or robot, processing system 106 may use the image data for navigation. In an example where system 100 is a smartphone, processing system 106 may use the image data to produced images for human consumption.

Processing system 106 may cause output devices 108 to produce various types of output. For instance, in the example of FIG. 1, output devices 108 include a display 110. Processing system 106 may cause display 110 to display images and/or video based on the image data generated by one or more of image sensors 102. Additionally, in the example of FIG. 1, output devices 108 may include one or more movement controllers 112. Movement controllers 112 may perform actions to move system 100. For instance, in examples system 100 is a vehicle, movement controllers 112 may steer, accelerate, or brake the vehicle. In an example where system 100 is a robot, movement controllers 112 may cause different portions of the robot to move in particular ways. It is to be understood that display 110 and movement controllers 112 are provided in FIG. 1 as examples of output devices 108 and not all examples include either or both display 110 and movement controllers 112, and that output devices 108 may include other types of devices and systems.

In the example of FIG. 1, ISP 104 includes a line buffer 114, a memory controller 116, and one or more image processors 118. Physically, line buffer 114 may include one or more memory units, such as cache units, registers, or random-access memory (RAM) units, having addressable storage locations. Line buffer 114 may comprise one or more units of consecutively addressed storage locations. Each unit of consecutively addressed storage locations of line buffer 114 may or may not be physically consecutive within the memory units. Lines of image data of the image data may be written into and read line buffer 114. In some examples, a line of image data includes a line of samples in an image. In some examples, a line of image data includes a line of image data blocks of image data. Example types of image data blocks may include macroblocks, largest coding units (LCUs), tree blocks, coding units (CUs) or other types of image data blocks. In this disclosure, "image data blocks" and "blocks" within line buffer 114 are different concepts.

Memory controller 116 may be implemented as a hardware unit within ISP 104 or may be integrated into one or more of image processors 118. Memory controller 116 is configured to manage flow of data to and from line buffer 114. As part of managing the flow of data to and from line buffer 114, memory controller 116 may allocate blocks of storage locations within line buffer 114 for specific purposes. In accordance with one or more techniques of this disclosure, memory controller 116 may allocate blocks of storage locations within line buffer 114 for storage of lines of image data associated with different contexts.

In this disclosure, a context may be a stream of image data. For example, a context may be the stream of full-frame image data generated by one of image sensors 102. In other words, the contexts may include one or more contexts associated with one or more image sensors. In some examples, a context may be a stream of image data representing a region within the image data generated by one of image sensors 102. Thus, images generated by a single image sensor may be partitioned into multiple regions and each of the regions may be a separate context. In some examples, different contexts may correspond to a different exposure lengths of the same scene. In this way, the contexts may include one or more contexts associated with one or more regions of interest within image data generated by a single image sensor. In some examples, the plurality of contexts may include one or more contexts associated with one or more image sensors and one or more contexts associated with regions within image data generated by one or more other image sensors.

Because the image data generated by image sensors 102 may have different characteristics, memory controller 116 may allocate differently sized block for storage of lines of the image data associated with different contexts. For example, memory controller 116 may determine, based on one or more characteristics of the image data associated with a specific context, a size of the block to be allocated to the specific context. For instance, memory controller 116 may allocate a larger block for storage of lines of high-definition image data associated with a first context and a smaller block for storage of lines of standard-definition image data associated with a second context. In another example, memory controller 116 may allocate a larger block for storage of lines of a larger region and a smaller block for storage of lines of a smaller region.

As noted above, lines of pixels of the image data may be written into and read from line buffer 114. When ISP 104 receives a line of image data associated with a context, the line of image data may conclude with an end-of-line code indicating the end of the line. Thus, memory controller 116 may determine, based on the end-of-line code and based on a number of lines of image that ISP 104 is configured to store for the context, how large of a block to allocate to the image sensor. In other examples, memory controller 116 may be preconfigured with information indicating how many storage locations within line buffer 114 to allocate as a block to each context.

Because memory controller 116 may flexibly allocate blocks for storage of lines of image data associated with a plurality of contexts, ISP 104 may be used in systems with various numbers of contexts and in systems having contexts associated with image data with various characteristics. Thus, ISP 104 is not limited to use with a particular set of image sensors. Different image sensors 102 may have different resolutions. Thus, in one example, the same line buffer 114 in ISP 104 may support one 64-megapixel image sensor, two 8-megapixel image sensors, three 4-megapixel image sensors, four 2-megapixel image sensors, a combination of one 16-megapixel image sensor with one 8-megapixel image sensor with two 2-megapixel image sensors, or other permutations and combinations. In another example, such as an example where system 100 is a mobile device, the same line buffer 114 in ISP 104 may support one 192-megapixel image sensor, two 36-megapixel image sensors, three 16-megapixel image sensors, a combination of one 36-megapixel image sensors with two 16-megapixel image sensors, or other permutations and combinations.

This system of flexibly allocating blocks for storage of image data stands in contrast to conventional systems in which there is a separate ISP for each context (e.g., image sensor) of the system. Thus, systems with different numbers of image sensors may need to have different numbers of ISPs. Have different numbers of ISPs may increase hardware complexity and cost.

Memory controller 116 may use pointers in examples where memory controller 116 allocates block to two or more contexts. For example, as part of allocating a block for storage of lines of image data associated with a specific context, memory controller 116 may establish a pointer that indicates an address (e.g., a real or virtual address) of a first storage location of the context. In some examples, memory controller 116 may also set an offset value indicating an offset of a last storage location of the context relative to the first storage location of the context. In instances where there is only a single context, it may be unnecessary for memory controller 116 to establish a pointer because memory controller 116 may assume that a first location (e.g., a location with a lowest memory address) within line buffer 114 is the start of the block associated with the context.

In some examples, memory controller 116 may record a context order during a hash table reset or during a common vertical blanking interval (VBI). A common VBI is also known as a sensor gap. Memory controller 116 (e.g., line buffer controllers (of memory controller 116) may support different orderings of contexts and memory controller 116 may change the orderings of contexts during hash table resets or during common VBIs. For example, memory controller 116 may change which memory locations are allocated to specific contexts during a hash table reset or a common VBI. Changing the order of contexts may be useful if too many or too few storage locations are allocated to specific contexts. A VBI may correspond to the amount of time that occurs between the end of a final visible line of a frame of a context and the start of the first visible line of a next image of a frame of the context. Thus, a VBI may occur after a last visible line of a frame of a context has been stored into line buffer 114 and before a first visible line of a next frame of the context has been stored into line buffer 114.

A "common" VBI refers to when VBIs of different contexts are temporally aligned. For example, three different contexts may correspond to three different exposure lengths of the same image sensor. In this example, the time at which memory controller 116 starts receiving lines of frames of the three contexts may be temporally aligned, but the times at which memory controller 116 receives the last visible lines of the frames may be different. Furthermore, in this example, a common VBI may occur within the three contexts after the last visible line of the longest exposure length frame is received. In another example, the contexts may correspond to different regions of interest within a frame generated by a single image sensor. In this example, a common VBI may occur after memory controller 116 stores the last line of the frame in line buffer 114. In other examples where there are multiple image sensors, a common VBI may only be possible when memory controller 116 stops receiving image data from all of the image sensors.

Image processors 118 of ISP 104 may process image data stored in line buffer 114. Image processors 118 may execute separate threads for respective contexts. For instance, in an example where image sensor 102A corresponds to a first context and image sensor 102B corresponds to a second context, image processors 118 may execute a first thread for image sensor 102A, a second thread for image sensor 102B, and so on. The processing thread for a context may read image data from the block of line buffer 114 allocated to the context, perform preprocessing operations on the image data, and export the preprocessed image data to processing system 106. Two or more of the threads may operate in parallel. In some examples, execution of the threads may be interleaved.

Processing system 106 and the various components of ISP 104 may be implemented as any of a variety of suitable circuitry components, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure.

Figures 2A, 2B, 2C, 2D:
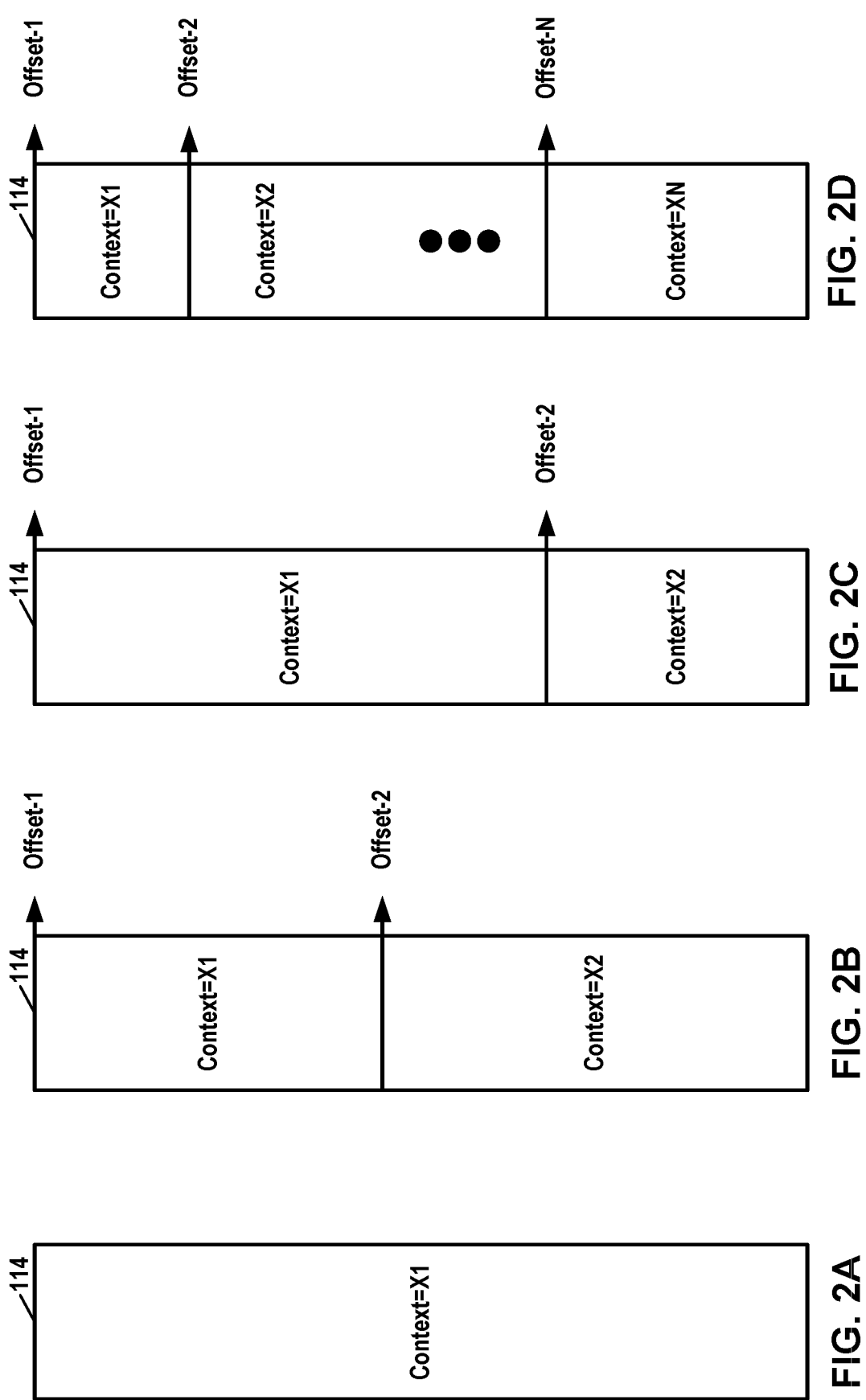
FIGS. 2A-2D are block diagrams illustrating example blocks allocated to one or more contexts according to techniques of this disclosure.

FIGS. 2A-2D are block diagrams illustrating example blocks allocated to one or more contexts according to techniques of this disclosure. In FIG. 2A, memory controller 116 has only allocated a single block (X1) within line buffer 114. Accordingly, the entirety of line buffer 114 may be considered to contain block X1 and memory controller 116 does not need to generate an offset value to indicate an offset of a last storage location of the context. In FIG. 2B, memory controller 116 has allocated two blocks (X1 and X2). A first offset value (Offset-1) indicates a first storage location of block X1. A second offset value (Offset-2) indicates a first storage location of block X2. In FIG. 2C, memory controller 116 has allocated two blocks (X1 and X2). As shown in FIG. 2C, the sizes of blocks X1, X2 may differ from the sizes of blocks X1, X2 in FIG. 2B. In FIG. 2D, memory controller 116 has allocated at least three blocks (X1, X2, and X2). A first offset value (Offset-1) indicates a first storage location of block X1, a second offset value (Offset-2) indicates a first storage location of block X2, and a third offset value (Offset-3) indicates a first storage location of block X3.

Figure 3:
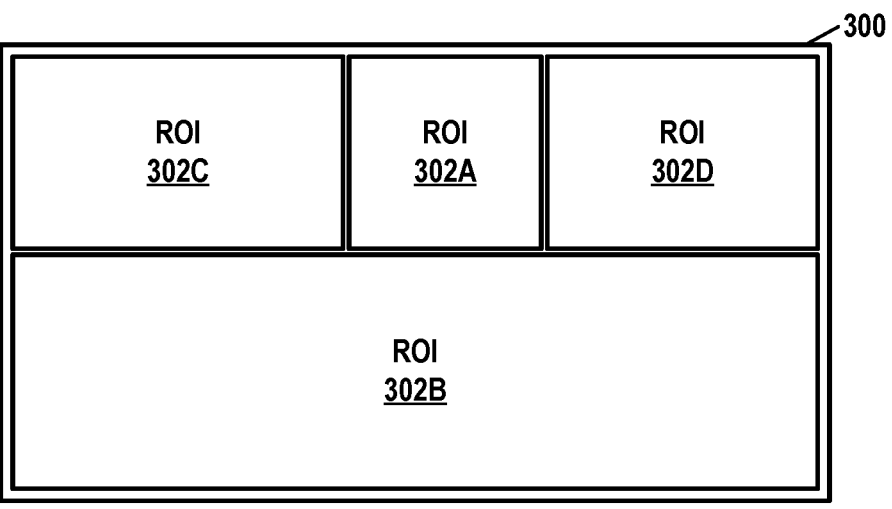
FIG. 3 is a conceptual diagram illustrating example regions of interest (ROIs) within a single frame of image data, in accordance with one or more techniques of this disclosure.

FIG. 3 is a conceptual diagram illustrating example regions of interest (ROIs) within a single frame of image data, in accordance with one or more techniques of this disclosure. In the example of FIG. 3, a frame 300 is divided into ROIs 302A, 302B, 302C, and 302D (collectively, "ROIs 302"). In other examples, a frame may be divided into different numbers of ROIs or differently arranged ROIs. In some examples, the ROIs may change from frame-to-frame.

Frames generated by an image sensor may be divided into ROIs for various reasons. For example, an image sensor may capture images from the interior of a vehicle, e.g., for purposes of ensuring that the driver is not distracted. In this example, the portion of the images associated with the driver may be of more interest than portions of the image corresponding to the front-seat passenger or the backseat. Thus, there may be different ROIs for the driver, front-seat passenger, and the backset. In another example, an image sensor may be mounted on an extended reality (XR) headset, facing in the same direction as a user. In this example, portions of images directly in front of the user's eyes may be more important than peripheral portions of the images. Thus, there may be an ROI for the central area and one or more ROIs for peripheral portions of the images.

In accordance with a technique of this disclosure, ISP 104 may treat each of ROIs 302 as a separate context. Thus, memory controller 116 may allocate blocks of storage locations within line buffer 114 to different ROIs and image processors 118 of ISP 104 may execute separate threads for each of ROIs 302. As shown in the example of FIG. 3, different ROIs 302 may have different shapes and sizes. Accordingly, memory controller 116 may allocate differently sized blocks of storage locations within line buffer 114 to different ROIs 302.

Figure 4:
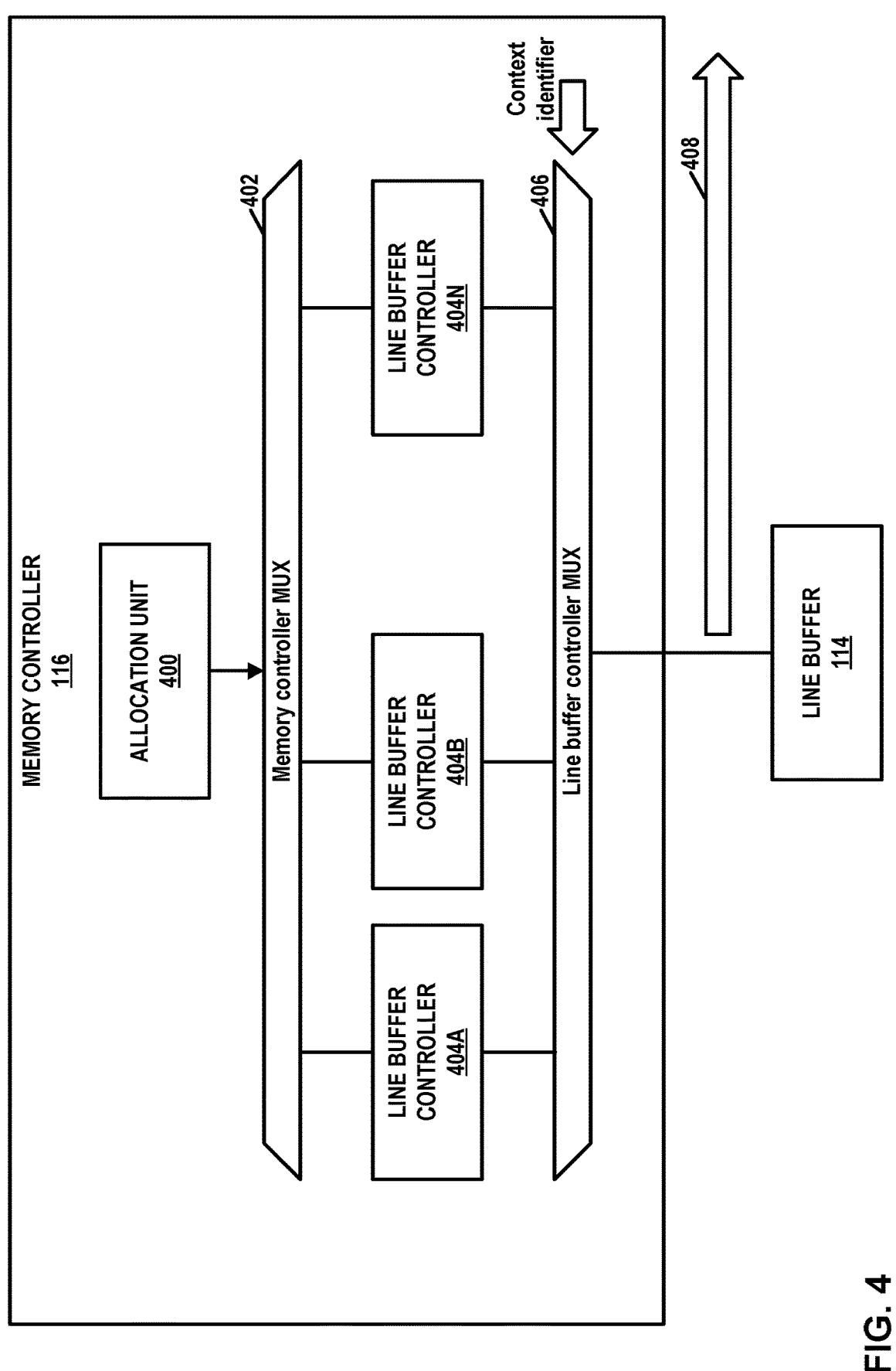
FIG. 4 is a conceptual diagram illustrating example components of memory controller according to techniques of this disclosure.

FIG. 4 is a conceptual diagram illustrating example components of memory controller 116 according to techniques of this disclosure. In the example of FIG. 4, memory controller 116 includes an allocation unit 400, a memory controller multiplexer (MUX) 402, a plurality of line buffer controllers 404A through 404N (collectively, line buffer controllers 404"), and a line buffer controller MUX 406. Allocation unit 400 may be configured to allocate blocks within line buffer 114 to different contexts. For example, when ISP 104 starts processing a new context, ISP 104 may initialize and start a new thread for processing the new context and may assign a context identifier to the new context. ISP 104 may start processing a new context in response to a new image sensor is connected to system 100. For instance, ISP 104 may initiate the thread associated with the context in response to a connection of an image sensor to the system. In some examples, ISP 104 may start one or more new contexts (and/or end one or more contexts) when a number of regions of interest or size of regions of interest changes.

As part of initializing the new thread, the new thread may send a request to allocation unit 400 to allocate a block of line buffer 114 to store lines of image data associated with the new context. The request may include the context identifier of the context. If allocation unit 400 has already allocated one or more blocks in line buffer 114 to contexts when allocation unit 400 receives a new context identifier, allocation unit 400 may allocate a block within line buffer 114 to a context identified by the new context identifier. Additionally, allocation unit 400 may initialize a line buffer controller for the context identified by the new context identifier. Thus, each of line buffer controllers 404 is associated with a context. When allocation unit 400 initializes a line buffer controller, allocation unit 400 may determine an offset for the block and send the offset to the line buffer controller. Allocation unit 400 may also return the offset to the thread as an indicator of a first storage location allocated to the context. Memory controller MUX handles the 1-to-many communications between allocation unit 400 and line buffer controllers 404.

Each of line buffer controllers 404 may handle requests to read data from and write data to the block of line buffer 114 allocated to the context. When memory controller 116 receives a request from a thread associated with a context to write or read data associated with the context, the request may include an identifier of the context. Memory controller MUX 402 may use the identifier of the context to route the request to the line buffer controller associated with the context. The line buffer controller associated with the context may verify, based on the offset associated with the context that an address in the request is within the block allocated to the context. The line buffer controller may then send a request via line buffer controller MUX 406 to line buffer 114 read or write data in the block allocated to the context. When the line buffer controller sends a request to read data, the line buffer controller receives the data from line buffer 114 and sends the data (shown as arrow 408) to the thread that requested to read the data.

In some examples, allocation unit 400 may implement error detection logic that determines of a sum of all blocks allocated to contexts exceeds a line buffer limit.

Figure 5:
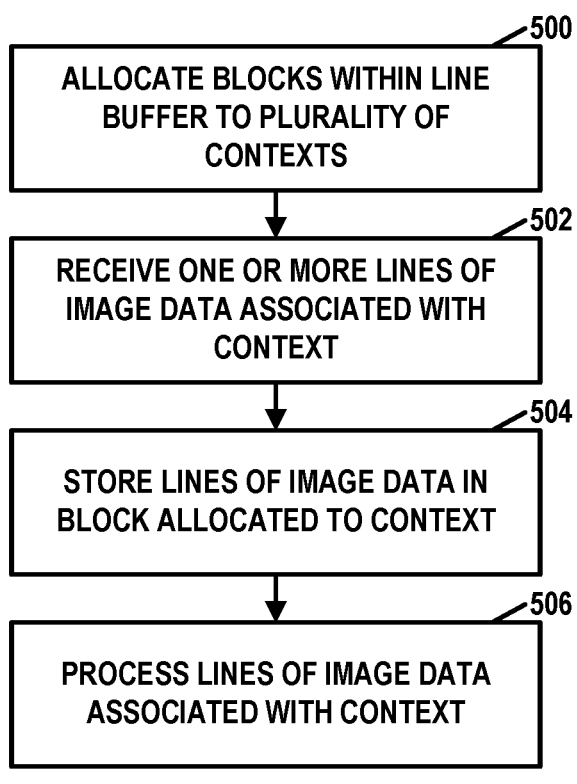
FIG. 5 is a flowchart illustrating an example method according to techniques of this disclosure.

FIG. 5 is a flowchart illustrating an example method according to techniques of this disclosure. In the example of FIG. 5, memory controller 116 of ISP 104 allocates blocks within line buffer 114 to a plurality of contexts (500). ISP 104 may be a discrete hardware unit and may include one or more image processors and the line buffer. In some examples, for each respective context of the plurality of contexts, memory controller 116 may determine a respective offset value to indicate a starting location in the line buffer of the block allocated to the respective context. Furthermore, in some examples, memory controller 116 may determine, based on one or more characteristics of the image data associated with a specific context, a size of the block to be allocated to the specific context. In such examples, memory controller 116 may allocate the blocks comprises the block to the specific context so that the block for the specific context has the size determined for the context. In some examples, for each respective context of the plurality of contexts, image processors 118, one or more image processors 118 may execute a thread associated with the respective context. The thread associated with the respective context processes the one or more lines of image data associated with the respective context that are stored in line buffer 114 in the block allocated to the respective context. The thread may request allocation of a block of the line buffer.

For each of the contexts, memory controller 116 of ISP 104 may receive one or more lines of image data associated with the context (502). For instance, a thread associated with the context may send a request to memory controller 116 to store the line of image data in line buffer 114. Memory controller 116 may store the one or more lines of image data associated with the context in the block allocated to the context (504).

One or more of the image processors of the ISP may process the one or more lines of image data associated with the context that are stored in the line buffer (506). In some examples, threads associated with the contexts may process the image data. Processing the lines of image data may include applying one or more filters to the lines of image data. ISP 104 may perform steps 502, 504, and 506 for each of the contexts.

Various examples of the techniques of this disclosure are summarized in the following clauses:

Clause 1. A system comprising: an image signal processor (ISP), wherein the ISP is a discrete hardware unit and includes a line buffer, a memory controller, and one or more image processors, wherein the memory controller is configured to: allocate blocks within the line buffer to a plurality of contexts; and for each of the contexts: receive one or more lines of image data associated with a respective context; and store the one or more lines of the image data associated with the context in a respective block allocated to the respective context, and wherein the one or more image processors of the ISP are configured to, for each respective context of the plurality of contexts, process the one or more lines of the image data associated with the respective context that are stored in the line buffer.

Clause 2. The system of clause 1, wherein the memory controller is configured to, as part of allocating the blocks, for each respective context of the plurality of contexts, determine a respective offset value to indicate a starting location in the line buffer of the respective block allocated to the respective context.

Clause 3. The system of any of clauses 1-2, wherein: the memory controller is further configured to determine, based on one or more characteristics of the image data associated with a specific context, a size of the block to be allocated to the specific context; and the memory controller is configured to allocate the block to the specific context so that the block for the specific context has the size determined for the context.

Clause 4. The system of any of clauses 1-3, wherein the plurality of contexts includes one or more contexts associated with one or more image sensors.

Clause 5. The system of any of clauses 1-4, wherein the plurality of contexts includes one or more contexts associated with one or more regions within image data generated by a single image sensor.

Clause 6. The system of any of clauses 1-5, wherein the one or more image processors are further configured to: for each respective context of the plurality of contexts, execute a thread associated with the respective context, wherein the thread associated with the respective context processes the one or more lines of the image data associated with the respective context that are stored in the line buffer in the block allocated to the respective context.

Clause 7. The system of clause 6, wherein, for each respective context of the plurality of contexts, the thread associated with the respective context is configured to request allocation of a block of the line buffer.

Clause 8. The system of any of clauses 6-7, wherein, for at least one context of the plurality of contexts, the ISP is configured to initiate the thread associated with the context in response to a connection of an image sensor to the system.

Clause 9. The system of any of clauses 1-8, wherein the one or more image processors are configured to, as part processing the one or more lines of image data, apply one or more filters to the one or more lines of image data.

Clause 10. The system of any of clauses 1-9, further comprising one or more image sensors that generate the image data.

Clause 11. The system of any of clauses 1-10, further comprising a plurality of image sensors that generate the image data, wherein two or more of the image sensors have different resolutions.

Clause 12. A method of processing image data, the method comprising: allocating, by a memory controller of an image signal processor (ISP), blocks within a line buffer to a plurality of contexts, wherein the ISP is a discrete hardware unit, the ISP includes one or more image processors and the line buffer; and for each of the contexts: receiving, by the memory controller, one or more lines of image data associated with a respective context; storing, by the memory controller, the one or more lines of the image data associated with the context in a respective block allocated to the respective context; and processing, by one or more of the image processors, the one or more lines of the image data associated with the respective context that are stored in the line buffer.

Clause 13. The method of clause 12, wherein allocating the blocks comprises, for each respective context of the plurality of contexts, determine, by the memory controller, a respective offset value to indicate a starting location in the line buffer of the respective block allocated to the respective context.

Clause 14. The method of any of clauses 12-13, wherein: the method further comprises determining, by the memory controller, based on one or more characteristics of the image data associated with a specific context, a size of the block to be allocated to the specific context; and allocating the blocks comprises allocating, by the memory controller, the block to the specific context so that the block for the specific context has the size determined for the context.

Clause 15. The method of any of clauses 12-14, wherein the plurality of contexts includes one or more contexts associated with one or more image sensors.

Clause 16. The method of any of clauses 12-15, wherein the plurality of contexts includes one or more contexts associated with one or more regions within image data generated by a single image sensor.

Clause 17. The method of any of clauses 12-16, wherein the method further comprises: for each respective context of the plurality of contexts, executing, on the one or more image processors of the ISP, a thread associated with the respective context, wherein the thread associated with the respective context processes the one or more lines of image data associated with the respective context that are stored in the line buffer in the block allocated to the respective context.

Clause 18. The method of clause 17, wherein the method further comprises, for each respective context of the plurality of contexts, requesting, by the thread associated with the respective context, allocation of a block of the line buffer.

Clause 19. The method of any of clauses 12-18, wherein processing the one or more lines of image data comprises applying one or more filters to the one or more lines of image data.

Clause 20. The method of any of clauses 12-19, wherein the image data includes image data generated by a plurality of image sensors, wherein two or more of the image sensors have different resolutions.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A system comprising:

an image signal processor (ISP), wherein the ISP is a discrete hardware unit and includes a line buffer, a memory controller, and one or more image processors, wherein the memory controller is configured to:

for each respective context of a plurality of contexts:

receive one or more lines of image data associated with the respective context, wherein each line of the one or more lines concludes with an end-of-line code indicating an end of the line;

determine, based on the end-of-line code and based on a quantity of lines of the image data the ISP is configured to store for the respective context, a size of a respective block to be allocated within the line buffer to the respective context;

allocate the respective block to the respective context; and store the one or more lines of the image data associated with the respective context in the respective block allocated to the respective context, and wherein the one or more image processors of the ISP are configured to, for each respective context of the plurality of contexts, process the one or more lines of the image data associated with the respective context that are stored in the respective block allocated to the respective context in the line buffer.

2. The system of claim 1, wherein the memory controller is configured to, for each respective context of the plurality of contexts, determine a respective offset value to indicate a starting location in the line buffer of the respective block allocated to the respective context.

3. The system of claim 1, wherein the plurality of contexts includes one or more contexts associated with one or more image sensors.

4. The system of claim 1, wherein the plurality of contexts includes one or more contexts associated with one or more regions within image data generated by a single image sensor.

5. The system of claim 1, wherein the one or more image processors are further configured to:

for each respective context of the plurality of contexts, execute a thread associated with the respective context, wherein the thread associated with the respective context processes the one or more lines of the image data associated with the respective context that are stored in the line buffer in the respective block allocated to the respective context.

6. The system of claim 5, wherein, for each respective context of the plurality of contexts, the thread associated with the respective context is configured to request allocation of a block of the line buffer.

7. The system of claim 5, wherein, for at least one context of the plurality of contexts, the ISP is configured to initiate the thread associated with the context in response to a connection of an image sensor to the system.

8. The system of claim 1, wherein the one or more image processors are configured to, as part processing the one or more lines of the image data associated with the respective context, apply one or more filters to the one or more lines of the image data associated with the respective context.

9. The system of claim 1, further comprising one or more image sensors that generate the image data.

10. The system of claim 1, further comprising a plurality of image sensors that generate the image data, wherein two or more image sensors of the plurality of image sensors have different resolutions.

11. A method of processing image data, the method comprising:

for each respective context of a plurality of contexts:

receiving, by a memory controller of an image signal processor (ISP), one or more lines of image data associated with the respective context, wherein the ISP is a discrete hardware unit and includes one or more image processors and a line buffer, each line of the one or more lines concludes with an end-of-line code indicating an end of the line;

determining, by the memory controller, based on the end-of-line code and based on a quantity of lines of the image data the ISP is configured to store for the respective context, a size of a respective block to be allocated within the line buffer to the respective context;

allocating, by the memory controller, the respective block to the respective context;

storing, by the memory controller, the one or more lines of the image data associated with the respective context in the respective block allocated to the respective context; and processing, by the one or more of the image processors, the one or more lines of the image data associated with the respective context that are stored in the line buffer.

12. The method of claim 11, wherein allocating the respective block comprises determining, by the memory controller, a respective offset value to indicate a starting location in the line buffer of the respective block allocated to the respective context.

13. The method of claim 11, wherein:

allocating the respective block comprises allocating, by the memory controller, the respective block to the respective context so that the respective block for the respective context has the determined size.

14. The method of claim 11, wherein the plurality of contexts includes one or more contexts associated with one or more image sensors.

15. The method of claim 11, wherein the plurality of contexts includes one or more contexts associated with one or more regions within image data generated by a single image sensor.

16. The method of claim 11, wherein the method further comprises:

for each respective context of the plurality of contexts, executing, on the one or more image processors of the ISP, a thread associated with the respective context, wherein the thread associated with the respective context processes the one or more lines of image data associated with the respective context that are stored in the line buffer in the respective block allocated to the respective context.

17. The method of claim 16, wherein the method further comprises, for each respective context of the plurality of contexts, requesting, by the thread associated with the respective context, allocation of a block of the line buffer.

18. The method of claim 11, wherein processing the one or more lines of the image data associated with the respective context comprises applying one or more filters to the one or more lines of the image data associated with the respective context.

19. The method of claim 11, wherein the image data includes image data generated by a plurality of image sensors, wherein two or more of the image sensors have different resolutions.

* * * * *